(12) United States Patent
Tetlow

(10) Patent No.: US 8,294,555 B2
(45) Date of Patent: Oct. 23, 2012

(54) COMMUNICATION SYSTEM FOR INDUCTIVE POWER TRANSFER SYSTEM

(75) Inventor: Stephen D. Tetlow, Wainuiomata (NZ)

(73) Assignee: Auckland UniServices Limited, Auckland (NZ)

( * ) Notice: Subject to any disclaimer, the term of this patent is extended or adjusted under 35 U.S.C. 154(b) by 879 days.

(21) Appl. No.: 11/993,837

(22) PCT Filed: Jun. 22, 2006

(86) PCT No.: PCT/NZ2006/000159
§ 371 (c)(1),
(2), (4) Date: Dec. 31, 2008

(87) PCT Pub. No.: WO2006/137747
PCT Pub. Date: Dec. 28, 2006

(65) Prior Publication Data
US 2009/0243799 A1    Oct. 1, 2009

(30) Foreign Application Priority Data
Jun. 22, 2005 (NZ) .......................... 540927

(51) Int. Cl.
*H04Q 5/22* (2006.01)

(52) U.S. Cl. ................. 340/10.1; 340/10.34; 340/12.38; 340/12.3; 340/12.22; 307/3; 307/7

(58) Field of Classification Search .............. 340/310.11
See application file for complete search history.

(56) References Cited

U.S. PATENT DOCUMENTS
| | | | |
|---|---|---|---|
| 5,153,583 A * | 10/1992 | Murdoch | ................... 340/10.34 |
| 5,293,308 A | 3/1994 | Boys et al. | |
| 6,459,218 B2 | 10/2002 | Boys et al. | |
| 2008/0174423 A1 * | 7/2008 | Breed | ....................... 340/539.22 |

FOREIGN PATENT DOCUMENTS
| | | | |
|---|---|---|---|
| WO | 2005031944 | | 4/2005 |
| WO | WO2005031944 | * | 4/2005 |
| WO | WO 2005031944 A1 | * | 4/2005 |

* cited by examiner

*Primary Examiner* — George Bugg
*Assistant Examiner* — Anthony D Afrifa-Kyei
(74) *Attorney, Agent, or Firm* — Lowe Graham Jones PLLC

(57) ABSTRACT

A return communication system and method for an Inductive Power Transfer (IPT) System allows a pick-up device (3) to receive an instruction and supply a load (36) in such a way that a predetermined variation occurs in current in the primary conductive path (2) of the system The variation may be detected and decoded to determine a response from the pick-up to the instruction.

17 Claims, 3 Drawing Sheets

US 8,294,555 B2

COMMUNICATION SYSTEM FOR INDUCTIVE POWER TRANSFER SYSTEM

PRIORITY CLAIM

Figure 1:
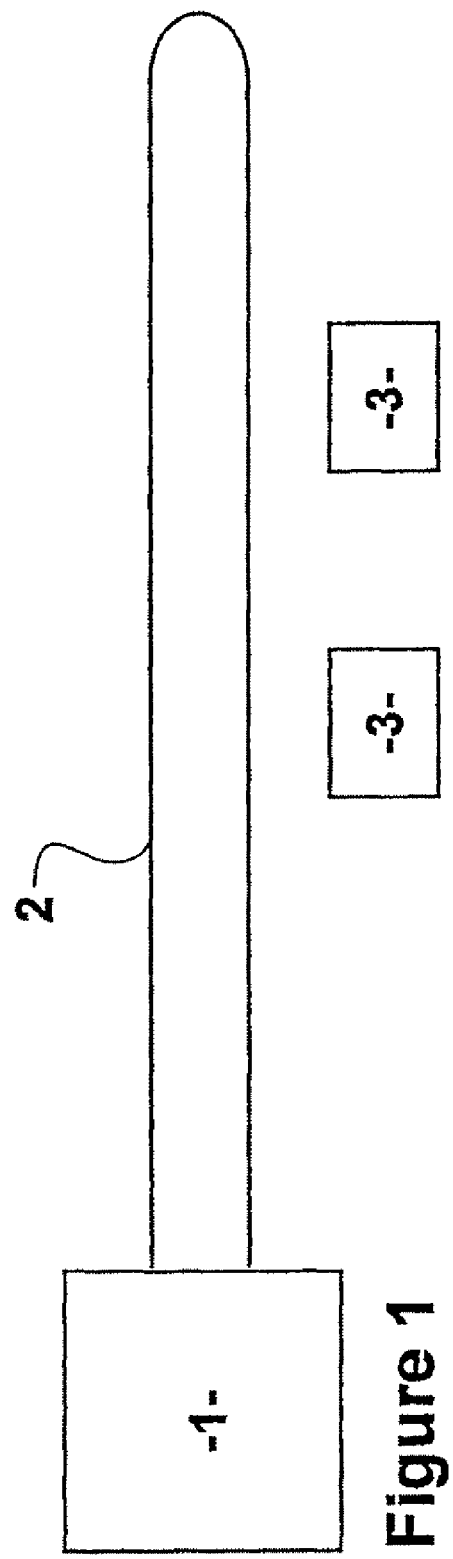

This application claims the benefit of prior New Zealand application number NZ 540927 filed Jun. 22, 2005, and PCT application number PCT/NZ2006/000159 filed Jun. 22, 2006.

FIELD OF THE INVENTION

This invention relates to communication methods and apparatus for allowing communication with inductive power transfer (IPT) secondary or pick-up devices which supply a load to communicate with apparatus remote from the pick-up device.

BACKGROUND

IPT systems typically comprise a primary conductive path (sometimes referred to as a track) which is energised by an appropriate electrical power supply such that a current is provided in the primary conductive path. The primary path will typically be an elongate cable which is energised with radio frequency (RF) current by a power supply. Distributed along the primary conductive path, but not in electrical contact with the path, are one or more pick-up devices which each have a secondary pick-up coil in which a current is induced by virtue of mutual inductance between the pick-up coil and the primary conductive path. Each pick-up usually includes control apparatus which controls the flow of power from the primary conductive path to the pick-up device so that the pick-up device may supply a load. IPT systems and an appropriate control implementation are disclosed generally in U.S. Pat. No. 5,293,308 to Boys. Furthermore, U.S. Pat. No. 6,459,218 discloses an application of IPT systems in powering road studs.

It is desirable to enable pick-ups to be controlled in various ways. In the road stud example, it is desirable to control the manner in which road studs are individually energised to enable traffic flow control. Therefore, in one example, road studs in a string may be controlled to be sequentially energised at a rate which can indicate to drivers a required speed of traffic flow.

In order to control the pick-ups so that the loads are operated in the desired fashion some form of communication is desirable between apparatus remote from the pick-up device, and the pick-up device itself. In one proposed communication system which is set out in published PCT patent specification WO 2005/031944, the primary conductive path is used as a communication path for instructions to be addressed to individual pick-up units by frequency modulating the current in the primary conductive path.

SUMMARY OF THE INVENTION

Accordingly in one aspect the invention consists in a communication method for an IPT system having a primary conductive path capable of being energised by an electric current, and one or more pick-ups adapted to receive electrical energy from the current in the primary path to supply a load, the method comprising the steps of:

transmitting an instruction over the primary path to a pick-up;

the pick-up providing a response to the instruction by supplying power to the load to induce a predetermined variation in the current in the primary conductive path;

detecting the variation in the current in the primary path and using the detected variation to determine the response.

The predetermined variation in the current may comprise a predetermined series of changes in the current, the changes being capable of being decoded to represent binary digits.

The predetermined variation can be detected as a frequency component of the current and the changes comprise the presence or absence of the detected frequency component. Alternatively or additionally the predetermined variation is detected as a frequency component of the current and the changes comprise changes in the frequency of the frequency component.

In one embodiment the response may be used to determine whether the pick-up is operative. Also, the response may relate to a parameter being measured by the pick-up. The parameter may be one or more of temperature or ambient light.

In another aspect the invention consists in an IPT system pick-up including a control means for receiving an instruction transmitted over a primary conductive path of the IPT system and adapted to provide a response to the instruction by supplying power to a load to cause a predetermined variation in the current on the primary conductive path such that the variation may be detected at a remote location on the primary conductive path to determine the response.

In yet another aspect the invention consists in communication apparatus for an IPT system, the apparatus comprising:

a first communication means for communicable connection to the primary conductive path of an IPT system;

a second communication means provided on a pick-up of the IPT system, the second communication means being capable of receiving an instruction communicated by the first communication means, and control means provided on the pick-up, the control means being adapted to control the supply of power to a load dependant on the second communication means such that a predetermined variation in the current of the primary conductive path occurs which may be detected by the first communication means to determine a response to the instruction.

DRAWING DESCRIPTION

One or more embodiments of the present invention will be described by way of example with reference to the following accompanying drawings, in which FIG. 1: is a block diagram of a known form of IPT system.

Figure 2:
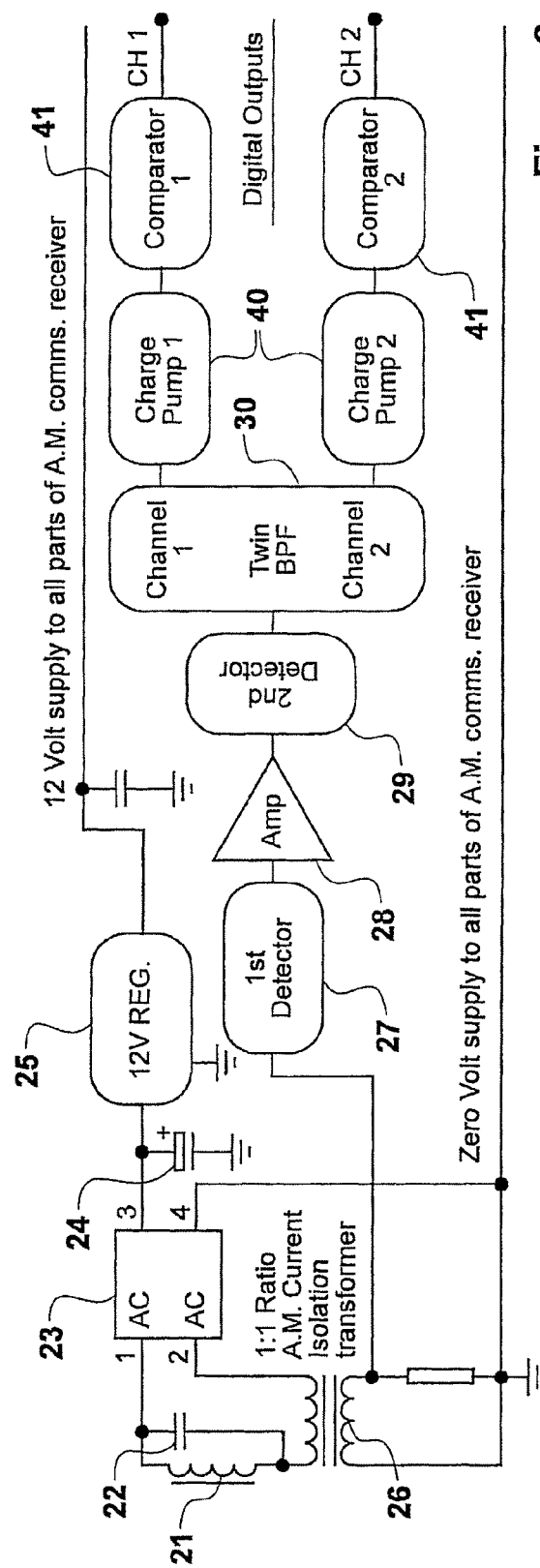

FIG. 2: is a block diagram of a communication device adapted to receive communication signals from the primary conductive path of an IPT system.

Figure 3:
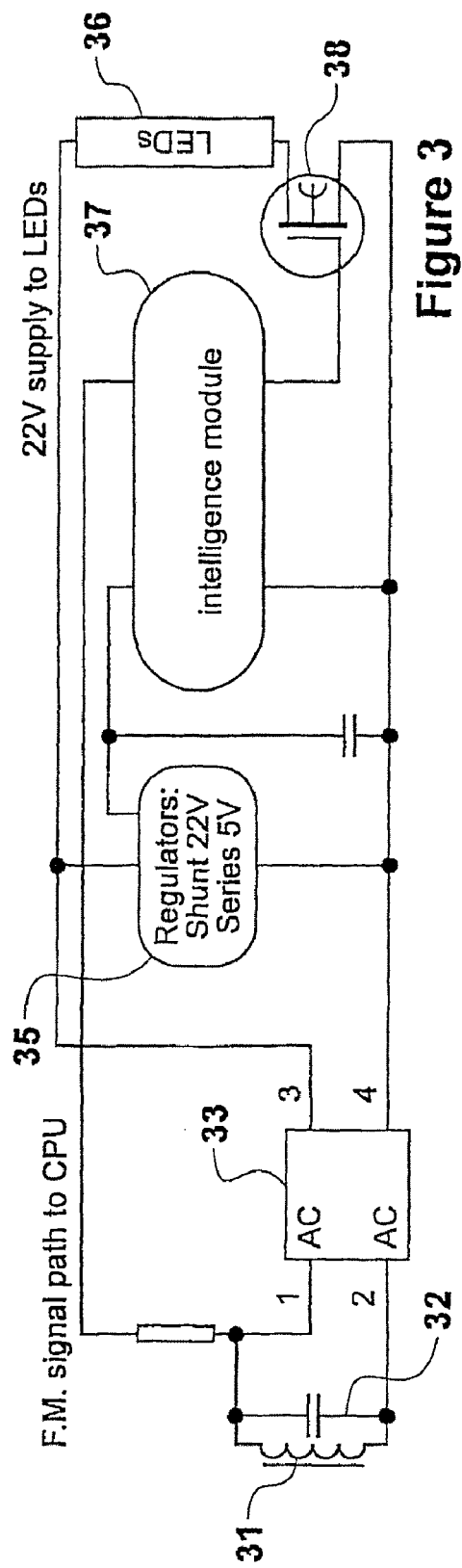

FIG. 3: is a block diagram of an electric circuit for a pick-up of an IPT system that may communicate with the device of FIG. 2.

DETAILED DESCRIPTION OF PREFERRED EMBODIMENTS

Referring to FIG. 1, a known IPT system is shown diagrammatically, comprising a power supply 1 which energises the primary conductive path 2. Placed adjacent to the path 2, but not in physical electrical contact with the path, are one or more pick-up devices 3 which may receive power from the primary conductive path by virtue of being inductively coupled to the path. Such systems are described in greater detail and in the aforementioned U.S. Pat. Nos. 5,293,308 and 6,459,218.

Referring now to FIG. 3, a block diagram for a possible pick-up 3 is illustrated. The pick-up has a pick-up coil 31 which is tuned by a tuning capacitor 32 to create a resonant circuit which is responsive to the magnetic field generated by the RF current in the primary conductive path 2.

A rectifier and control module 33 rectifies the alternating current from the resonant circuit formed by components 31 and 32. The output of unit 33 regulated by regulators 35 to provide two power supplies. The first power supply (in this example 22V) is provided to a load 36 which, in this example, is a road stud in which the load comprises a number of light emitting diodes (LEDs) 36. Those skilled in the art will appreciate that in alternate embodiments other types of load may be supplied, and that the pick-up may supply higher power loads than those in the embodiments described herein.

A second power supply which, in this example, is a 5V supply provides the supply for an intelligence module 37 which is typically provided in the form of an integrated circuit, such as a microprocessor. Module 37 is provided directly with a signal feed from the resonant circuit formed by components 31 and 32, and has an output which is used to control a switching device 38 which is operable to energise the load 36.

In use, communication signals, for example frequency modulated signals, which are imposed on the current in the primary conductive path 2 are also received in the resonant circuit formed by components 31 and 32 of the pick-up, and are passed directly to module 37 where they may be interpreted as a particular instruction. For example, the instruction may be to activate the load so as to provide a physical signal to traffic.

In one embodiment of the invention, the instruction may be communicated using the system or method disclosed in the aforementioned publication WO 2005/031944 the disclosure of which is incorporated herein by reference.

The instruction may alternatively be one to energise the LEDs for only a limited period of time, or to enter into a sequence, for example, a flashing sequence. Those skilled in the art to which the invention relates will appreciate that the instruction may be more complex in nature, for example if the load comprises a motor, then the instruction may be to index the motor to a predetermined position, or cause a carriage that the motor drives to move to a predetermined location. The module 37 causes the load to be energised by activating switch device 38 as required.

The act of energising the load causes power to be transferred from the primary conductive path to the resonant circuit of the pick-up, and this in turn causes a perturbation or variation in the current in the primary conductive path 2. This variation in the current in the primary conductive path will depend upon the manner in which the load is energised. In a preferred embodiment, the load is energised at a selected frequency. The variation in the primary path current can thus be detected as a frequency component of the current in the path by an appropriate communication circuit which is in communication with the primary conductive path 2. An example of such a communication circuit is shown in FIG. 2, and will be described further below. Although the circuit shown in FIG. 2 is intended to be provided adjacent to the power supply 1, those skilled in the art will appreciate that it could be located at any other convenient point along the primary conductive path and does not need to be in physical electrical contact with the primary conductive path.

The module 37 may energise the load in a variety of different ways to provide the return communication signal. For example, the return communication signal may simply comprise detection that the load 36 has been energised after the instruction to energise the load has been received. However, as an alternative, the module 37 may energise the load in a predetermined pattern of operation to provide a return communication signal. For example, if the load comprises light emitting diodes, then these may be switched at a very fast rate so that the objective of providing illumination is still achieved, and may appear to the road user as constant illumination, but the very fast flashing of the LEDs creates a predetermined variation that can be provided as a digitally encoded signal (i.e. can be detected as a series of binary digits that may form a digital word) which is imposed on the primary conductive path for detection. In a preferred embodiment the load is activated at one or more predetermined frequencies, so that the variation comprises changes of frequency that may be demodulated to provide a digital output. Alternatively, a single frequency may be used which changes with time by being either present or absent to provide the changes for decoding. Those skilled in the art will appreciate that other modulation techniques could be used.

As another example, the pick-up may be provided with various sensors which provide information to module 37. In one example, the sensor may be a temperature sensor which can provide an indication as to whether a fire may be present in the vicinity of the pick-up. In another example, the sensor may be a light sensor which can detect the presence or absence of ambient light, for example whether the lighting in a tunnel in which the pick-up may be located, is operative or inoperative. With each of these sensors, an instruction may be sent over the primary conductive path addressed to one or more particular pick-ups, requesting them to report back the status of the sensor or sensors. The module 37 can then take a reading from the sensor and energise the load 36 in a predetermined pattern that causes a variation in the current primary conductive path 2 which may be detected and decoded to reveal the reading provided by the relevant sensor.

Referring now to FIG. 2, a coil 21 and tuning capacitor 22 comprise a resonant circuit which picks up energy from the primary conductive path 2, and which is preferably located adjacent to the power supply 1 (refer to FIG. 1). A rectifying and control module 23 is filtered by a filter capacitor 24. A regulation circuit 25 provides a power supply (in this example a 12V supply) to the communications receiver apparatus. A current isolation transformer 26 provides an isolated signal representative of the current on the primary conductive path 2 to a first detector 27. The output of the detector 27 is provided to amplifier 28, the output of which is provided to a second detector unit 29 and then passed to a twin band pass filter (BPF) 30 which provides a two channel output from which information is provided in two channels. In practical terms, the twin BPF could be a single Band Pass Filter, or even a multiple band pass filter. In the embodiment illustrated, the twin Band Pass filter features a pair of fairly high 'Q', solid state, audio filters. These offer a small amount of analogue gain, at the frequency of operation, and have a response curve that is much like that of the tuned circuits used in the pickups. At frequencies that are outside of their pass band, they substantially attenuate the signal. These filters are tuned to match the frequencies that are emerging from the pick-ups 3 during return communications events. In a preferred embodiment Digital Signal Processing (DSP) devices may perform this role. Two BPF's allow the following concepts to be implemented:

1) The use of 'frequency warble' i.e. having two frequencies between which the detected signal moves on the return communications signal, to improve the rate at which the data could be returned to the power supply's receiver.

2) The use of two distinct frequencies, in order to allow two pick-ups to reply at the same time.

Aspect 2) is aimed at providing an 'emergency channel' in case an urgent communications event takes place during normal communications. This permits a greater degree of latitude, where communications collisions may otherwise occur.

The signal in each channel may be decoded by appropriate known decoding means to provide the required information. In the embodiment shown the charge pumps 40 that appear after the filters, are intended to develop a charge on a capacitor when the filter receives a signal of the correct frequency. That DC level is then fed to the appropriate comparator 41, in order to provide a logic '1' or '0' state.

From the comparator's output, the data that was imparted to the primary path by the pick-up under scrutiny is able to be recovered.

In a preferred embodiment, the communication occurs digitally, and a digital signal processing integrated circuit may be used to perform signal recovering control.

From the foregoing it will be seen that embodiments of the invention may provide significant advantages such as:
- no additional communications apparatus is required within the remote communications device on the pick-up that is being monitored;
- the receiver is totally isolated which allows one or more of them to be placed anywhere on the primary conductive path of the IPT system.

Although the variations in the current primary conductive path are very small, typically 0.1%, they are readily picked up by an inductively coupled receiving device. As the receiver and senders are inductively powered, they may be placed at any point along the length of the conductive path. In practice the receiver is housed within the cabinet of the inductive power source, and the senders i.e. the pick-ups, numbering from 1 to 100's, are distributed along the length of the path.

In a preferred embodiment, the variations in the current primary path that are caused by the load variation are immediately converted into their digital representation and the response may be used to decide upon the condition of the pick-up device under scrutiny.

We have found that in a system containing 200 road studs (each road stud being a pick-up, or the load supplied by a pick-up), for example, on a 2000 m long path, the generator may need only a few minutes to check the entire system.

Furthermore, in the example of a road stud system, the stud that is under interrogation will appear to the motorist to become slightly less bright for about two seconds, then return to normal brightness. As each road stud pick-up already contains a small microprocessor that permits it to understand instructions from the generator, it is only a simple matter of adding software so that it can enter the return communications loop.

Those skilled in the art to which the invention relates will appreciate that although the invention is being described with reference to an IPT powered road stud, this return communication system is applicable to any form of inductively powered apparatus. This may include material handling or people moving systems.

The invention claimed is:

1. A communication method for an IPT system having a primary conductive path capable of being energized by an electric current, and one or more pick-ups adapted to receive electrical energy from the current in the primary path to supply a load, the method comprising the steps of:
    transmitting an instruction over the primary path to a pick-up;
    the pick-up acting on to the instruction by supplying power to the load to induce a predetermined variation in the current in the primary conductive path;
    detecting, at a location remote from primary path, the variation in the current in the primary path and using the detected variation to determine a response from the pick-up to the instruction.

2. A communication method as claimed in claim 1 wherein the predetermined variation in the current comprises a predetermined series of changes in the current, the changes being capable of being decoded to represent binary digits.

3. A communication method as claimed in claim 2 wherein the predetermined variation is detected as a frequency component of the current and the changes comprise the presence or absence of the detected frequency component.

4. A communication method as claimed in claim 2 wherein the predetermined variation is detected as a frequency component of the current and the changes comprise changes in the frequency of the frequency component.

5. A communication method as claimed in claim 1 wherein the response indicates whether the pick-up is operative.

6. A communication method as claimed in claim 2 wherein the response is operative.

7. A communication method as claimed in claim 3 wherein the response indicates whether the pick-up is operative.

8. A communication method as claimed in claim 4 wherein the response indicates whether the pick-up is operative.

9. A communication method as claimed in claim 1, wherein the response provides an indication of a parameter being measured by the pickup.

10. A communication method as claimed in claim 2 wherein the response provides an indication of a parameter being measured by the pickup.

11. A communication method as claimed in claim 3 wherein the response provides an indication of a parameter being measured by the pickup.

12. A communication method as claimed in claim 4 wherein the response provides an indication of a parameter being measured by the pickup.

13. A communication method as claimed in claim 9 wherein the parameter comprises temperature.

14. A communication method as claimed in claim 9 wherein the parameter comprises ambient light.

15. An IPT system pick-up including a control means for receiving an instruction transmitted over a primary conductive path of the IPT system and adapted to act on the instruction by supplying power to a load to cause a predetermined variation in the current on the primary conductive path such that the variation may be detected at a remote location on the primary conductive path to determine a response from the pick-up to the instruction.

16. Communication apparatus for an IPT system, the apparatus comprising:
    a first communication means for communicable connection to the primary conductive path of an IPT system;
    a second communication means provided on a pick-up of the IPT system, the second communication means being capable of receiving an instruction communicated by the first communication means, and control means provided on the pick-up, the control means being adapted to control the supply of power to a load dependent on the second communication means such that a predetermined variation in the current of the primary conductive path occurs which may be detected by the first communication means at a location remote from the pick-up and on the primary conductive path to determine a response to the instruction.

17. A communication method as claimed in claim 1 wherein said detecting is performed within a cabinet housing the power source used to energize the primary conductive path.

* * * * *